(12) United States Patent
Kamiya et al.

(10) Patent No.: US 11,493,005 B2
(45) Date of Patent: Nov. 8, 2022

(54) INTAKE DEVICE

(71) Applicants: DENSO CORPORATION, Kariya (JP); TOYOTA JIDOSHA KABUSHIKI KAISHA, Toyota (JP)

(72) Inventors: Shinichi Kamiya, Kariya (JP); Shunsuke Rikitake, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 881 days.

(21) Appl. No.: 16/355,905

(22) Filed: Mar. 18, 2019

(65) Prior Publication Data

US 2019/0293032 A1 Sep. 26, 2019

(30) Foreign Application Priority Data

Mar. 23, 2018 (JP) .................. JP2018-56136

(51) Int. Cl.
*B01D 35/02* (2006.01)
*B01D 29/60* (2006.01)
(Continued)

(52) U.S. Cl.
CPC ......... *F02M 35/0205* (2013.01); *B01D 29/60* (2013.01); *B01D 35/02* (2013.01); *B01D 35/06* (2013.01); *B01D 35/14* (2013.01); *B01D 35/30* (2013.01); *F02M 35/0202* (2013.01); *F02M 35/024* (2013.01); *F02M 35/0217* (2013.01); *F02M 35/10249* (2013.01); *F02M 35/10373* (2013.01); *G01F 1/692* (2013.01); *B01D 2201/50* (2013.01)

(58) Field of Classification Search
CPC ........ B01D 29/60; B01D 35/02; B01D 35/06; B01D 35/14; B01D 35/30; B01D 46/00; B01D 46/44; B01D 46/0086; F02M 35/0205; F02M 35/0217; F02M 35/10249; F02M 35/10373
USPC ........... 55/385.3, DIG. 34; 96/417, 421, 422
See application file for complete search history.

(56) References Cited

U.S. PATENT DOCUMENTS 5,351,035 A * 9/1994 Chrisco .................. B01D 46/46
116/DIG. 25
5,688,308 A * 11/1997 Voigts ....................... B03C 3/68
96/407

(Continued)

FOREIGN PATENT DOCUMENTS

| JP | 63-243429 | 10/1988 |
| JP | 64-41661 | 3/1989 |
| JP | 2006-226229 | 8/2006 |

*Primary Examiner* — Minh Chau T Pham
(74) *Attorney, Agent, or Firm* — Nixon & Vanderhye P.C.

(57) ABSTRACT

An intake device includes an air filter that filters intake air for an internal combustion engine, a filter casing housing the air filter, and an air physical quantity sensor. The filter casing includes an intake passage to allow the intake air to pass from upstream to downstream of the air filter. The filter casing has a passage wall portion that is electrically conductive and exposed to the intake passage on a downstream side of the air filter. The air physical quantity sensor has: a sensor element that detects a specific physical quantity related to the intake air on a downstream side of the air filter; and a grounding structure electrically connected to the passage wall portion for grounding the sensor element.

9 Claims, 13 Drawing Sheets

(51) Int. Cl.
*F02M 35/02* (2006.01)
*F02M 35/10* (2006.01)
*F02M 35/024* (2006.01)
*B01D 35/30* (2006.01)
*B01D 35/14* (2006.01)
*G01F 1/692* (2006.01)
*B01D 35/06* (2006.01)

(56) References Cited

U.S. PATENT DOCUMENTS

| | | | | |
|---|---|---|---|---|
| 5,718,822 A * | 2/1998 | Richter | ................ | B01D 35/143 |
| | | | | 210/90 |
| 7,594,960 B2 * | 9/2009 | Johansson | .......... | B01D 46/0086 |
| | | | | 96/417 |
| 7,749,303 B2 * | 7/2010 | Wright | ................ | A62B 18/088 |
| | | | | 96/417 |
| 8,343,265 B2 * | 1/2013 | Yamamoto | ........... | F02M 35/162 |
| | | | | 55/385.3 |
| 8,696,777 B1 * | 4/2014 | Patil | ........................ | F01N 13/10 |
| | | | | 96/417 |
| 9,120,043 B2 * | 9/2015 | Johansson | .......... | B01D 46/0086 |
| 9,937,453 B2 * | 4/2018 | Baek | ......................... | F24F 8/10 |
| 2001/0027683 A1 | 10/2001 | Igarashi et al. | | |
| 2005/0241389 A1 | 11/2005 | Kitahara et al. | | |
| 2006/0207571 A1 | 9/2006 | Hattori | | |
| 2010/0031737 A1 | 2/2010 | Saito et al. | | |
| 2012/0079879 A1 | 4/2012 | Saito et al. | | |
| 2012/0198925 A1 | 8/2012 | Saito et al. | | |
| 2014/0331761 A1 * | 11/2014 | Kaifu | ........................ | G01F 1/69 |
| | | | | 73/204.25 |
| 2015/0041334 A1 * | 2/2015 | Matsuoka | .......... | G01N 27/4065 |
| | | | | 205/775 |
| 2016/0108868 A1 | 4/2016 | Tanahashi et al. | | |
| 2016/0153819 A1 | 6/2016 | Unger et al. | | |
| 2016/0186703 A1 | 6/2016 | Tanahashi et al. | | |
| 2018/0283918 A1 * | 10/2018 | Miki | ........................ | G01F 1/68 |

\* cited by examiner

US 11,493,005 B2

INTAKE DEVICE

CROSS REFERENCE TO RELATED APPLICATION

This application is based on Japanese Patent Application No. 2018-56136 filed on Mar. 23, 2018, the disclosure of which is incorporated herein by reference in its entirety.

TECHNICAL FIELD

The present disclosure relates to an intake device.

BACKGROUND ART

A self-discharge static eliminator is installed on a wall surface of an intake passage downstream of an air filter, in an intake device. When the potential becomes high due to the charge accumulation in the self-discharge static eliminator, the charge amount on the wall surface of the intake passage is reduced by the self-discharge, thereby making it possible to improve the intake efficiency.

SUMMARY

According to an aspect of the present disclosure, an intake device includes an air filter, a filter casing, and an air physical quantity sensor. The air filter filters intake air for an internal combustion engine. The filter casing houses the air filter and includes an intake passage to allow the intake air to pass from upstream to downstream of the air filter, the filter casing having a passage wall portion located downstream of the air filter. The passage wall portion is electrically conductive and exposed to the intake passage. The air physical quantity sensor has: a sensor element located downstream of the air filter to detect a specific physical quantity related to the intake air; and a grounding structure electrically connected to the passage wall portion for grounding the sensor element.

DETAILED DESCRIPTION

Figure 13:
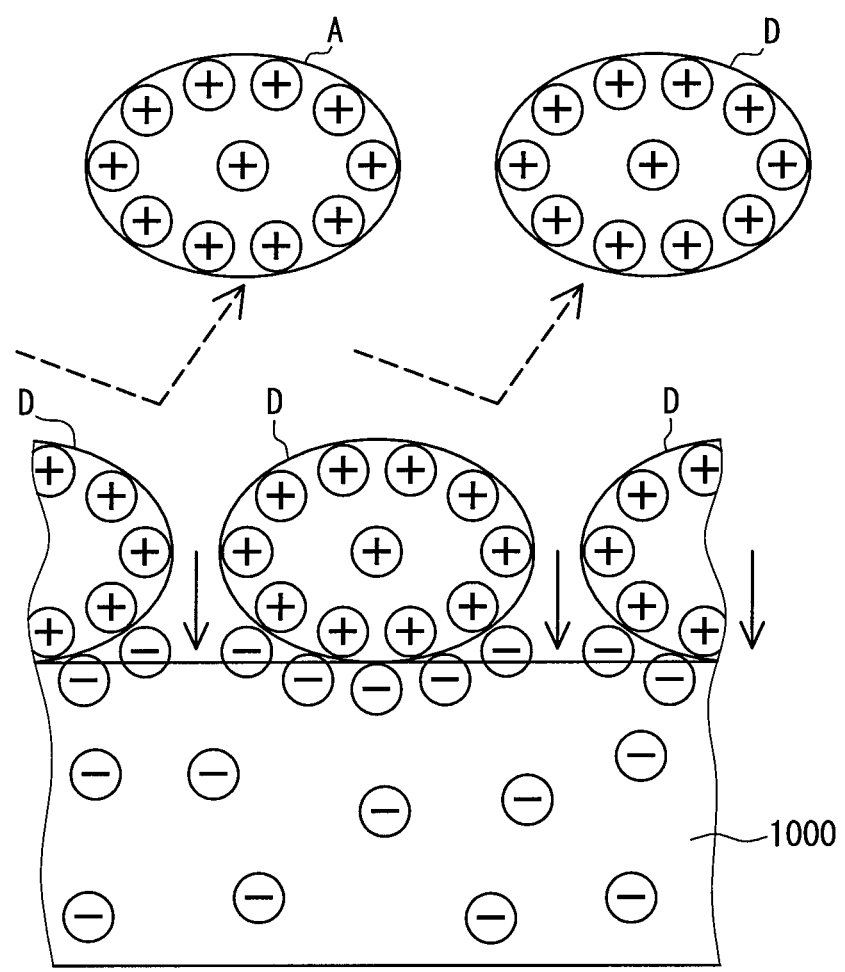
FIG. 13 is a schematic view for explaining foreign matters electrodeposited on a passage wall in a comparison example.

As schematically shown in FIG. 13, due to the frictional contact with the air filter, the intake air A or the foreign matter D contained in the intake air A is positively charged (+ in FIG. 13). On the other hand, due to the frictional contact with the intake air A or the foreign matter D, a passage wall 1000 made of resin is negatively charged (− in FIG. 13). As a result, the positively-charged foreign matter D electrodeposits and accumulates on the negatively-charged surface of the passage wall 1000, and the positively-charged intake air A or the positively-charged foreign matter D is repelled. In this case, the intake air A is easily separated from the surface of the passage wall 1000.

While the self-discharge static eliminator continues accumulating the electric charges, the self-discharge does not occur and the intake air A may continue to separate from the surface of the passage wall 1000. Since the separation of the intake air A increases the intake resistance (pressure loss of intake air), a smooth air flow is hindered, such that the improvement in the intake efficiency is reduced.

The intake device may include an air physical quantity sensor installed downstream of the air filter to detect a specific physical quantity related to the filtered intake air. Under this situation, while the self-discharge static eliminator accumulates the electric charges, the foreign matter D contained in the intake air A is electrodeposited and accumulated on the air physical quantity sensor, so that the intake efficiency cannot be improved. In addition, the electrodeposited foreign matter D contaminates the air physical quantity sensor itself, causing degradation of the sensor.

The present disclosure provides an intake device in which the intake efficiency is improved while suppressing deterioration in the sensor.

Hereinafter, an aspect of the present disclosure will be described.

According to an aspect of the present disclosure, an intake device includes an air filter that filters intake air for an internal combustion engine, a filter casing, and an air physical quantity sensor. The filter casing includes an intake passage housing the air filter to allow the intake air to pass from upstream to downstream of the air filter. The filter casing has a passage wall portion that is electrically conductive and exposed to the intake passage on a downstream side of the air filter. The air physical quantity sensor has: a sensor element that detects a specific physical quantity related to the intake air on a downstream side of the air filter; and a grounding structure electrically connected to the passage wall portion for grounding the sensor element.

Accordingly, the passage wall portion of the casing is exposed to the intake passage on the downstream side of the air filter, while the intake air flows through the intake passage from the upstream to the downstream of the air filter housed in the filter casing. Therefore, the passage wall portion is negatively charged by frictional contact with the intake air or the foreign matter contained in the intake air. The positively-charged foreign matter in the intake air due to the frictional contact with the air filter may electrodeposit on the surface of the passage wall portion. Further, according to another aspect of the present disclosure, the specific physical quantity related to the intake air is detected by the sensor element of the air physical quantity sensor downstream of the air filter. Since the air physical quantity sensor is negatively charged by frictional contact with the intake air or the foreign matter, the positively-charged foreign matter may electrodeposit on the surface of the sensor.

According to the present disclosure, the grounding structure for grounding the sensor element of the air physical quantity sensor is electrically connected with the conductive passage wall portion. In this state, the negative charge charged on each of the passage wall portion and the air physical quantity sensor can be quickly released to the grounding structure. Accordingly, it becomes difficult for the foreign matter to electrodeposit on the surface of the passage wall portion and the surface of the air physical quantity sensor, at a location downstream of the air filter. Therefore, it is possible to suppress an increase in the intake resistance caused by the separation of positively-charged intake air or foreign matter from the surfaces of the passage wall portion and the air physical quantity sensor. Thus, it is possible to improve the intake efficiency. Further, since contamination of the air physical quantity sensor itself due to electrodeposition of foreign matter can be reduced, deterioration of the sensor can be suppressed.

Figure 1:
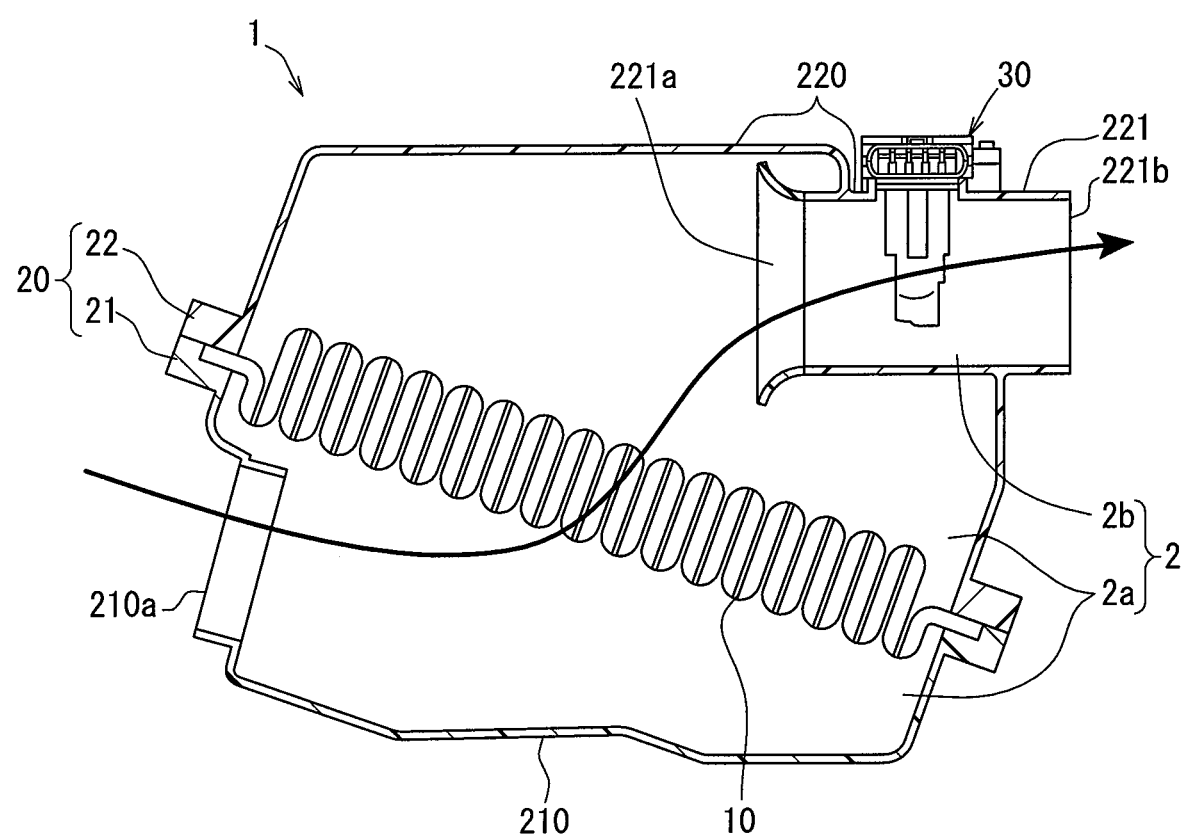
FIG. 1 is a sectional view illustrating an intake device according to an embodiment.

As shown in FIG. 1, an intake device 1 according to an embodiment of the present disclosure is mounted on a vehicle, and is applied to an internal combustion engine that drives the vehicle. The intake device 1 filters and guides air into the internal combustion engine through an intake passage 2. The intake device 1 includes a detector that detects a specific physical quantity related to the intake air. Specifically, the intake device 1 includes an air filter 10, a filter casing 20, and an air physical quantity sensor 30.

The air filter 10 is formed of a mesh material. The air filter 10 is made of, for example, resin, paper or metal. In this embodiment, the material forming the air filter 10 is a bellows nonwoven fabric made of polyurethane resin. The air filter 10 is arranged within the filter casing 20 to partition the intake passage 2. The intake air flowing through the intake passage 2 is filtered by passing through the air filter 10 in the filter casing 20. At this time, the air filter 10 collects foreign objects having size larger than the mesh from the intake air.

The filter casing 20 is formed by combining casing members 21, 22. The casing members 21, 22 are separately formed from a conductive material to have cup shape or dish shape. The conductive material forming each of the casing members 21, 22 is, for example, a conductive resin or metal. In this embodiment, the conductive material forming each of the casing members 21, 22 is a polypropylene resin containing a conductive filler such as conductive carbon. The casing members 21 and 22 are joined together at the openings therebetween the air filter 10 is arranged. As a result, the filter casing 20 is formed by the casing members 21 and 22 electrically connected to each other, to form the intake passage 2, such that the intake air passes from the upstream to the downstream of the air filter 10 housed in the intake passage 2. In the present embodiment, the intake passage 2 includes a filter space 2a in which the air filter 10 is housed and a throttled space 2b whose volume is smaller than the filter space 2a.

The upstream casing member 21 has a conductive upstream passage wall 210 entirely exposed to the filter space 2a of the intake passage 2 upstream of the air filter 10. The upstream passage wall 210 has an inlet portion 210a opened to allow the intake air to flow from outside of the vehicle into the filter space 2a.

Figure 2:
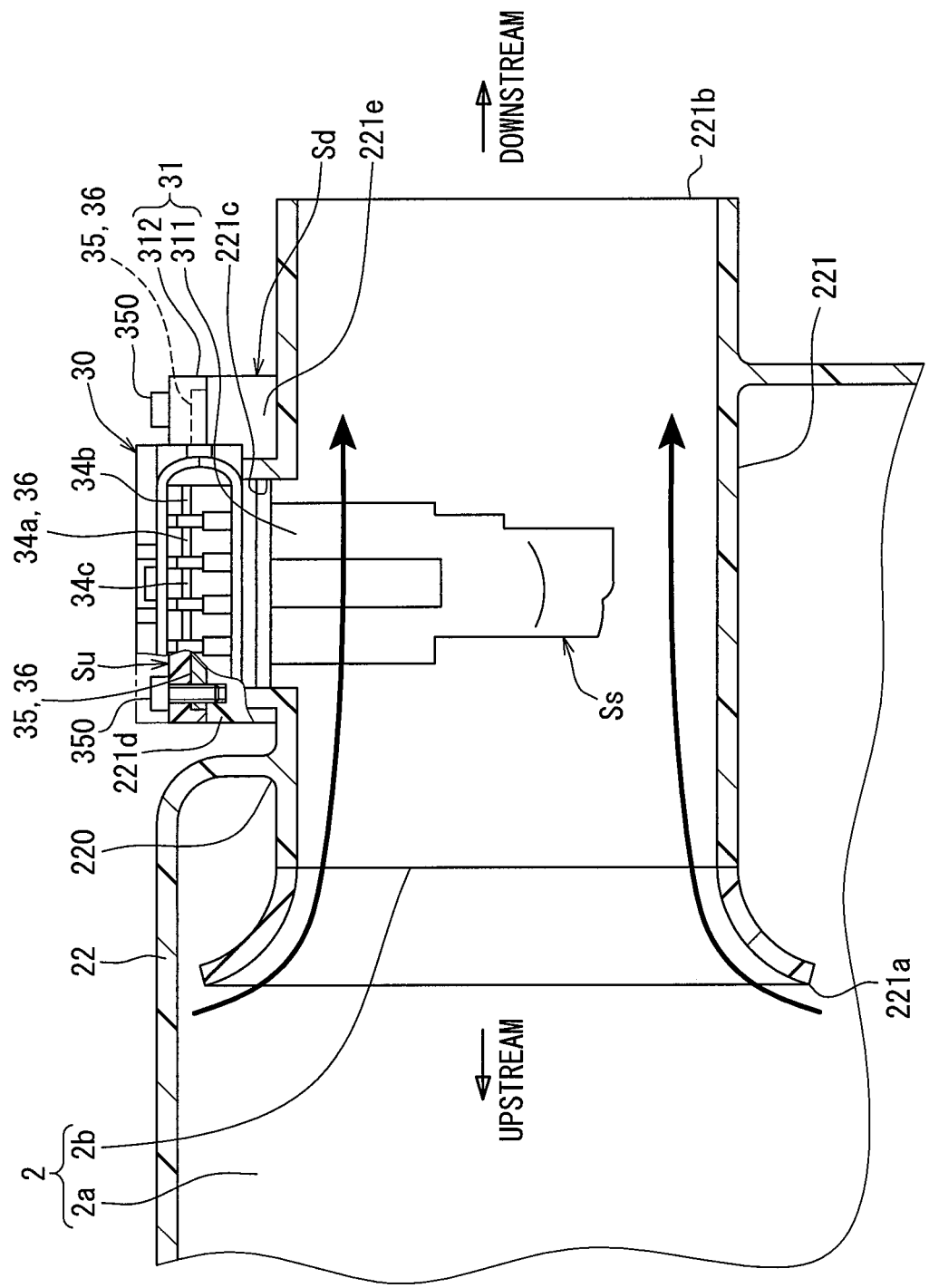
FIG. 2 is a sectional view illustrating the intake device according to the embodiment.

As shown in FIGS. 1 and 2, the downstream casing member 22 has a conductive downstream passage wall portion 220. The downstream passage wall portion 220 is entirely exposed to the filter space 2a of the intake passage 2 downstream of the air filter 10 and the throttled space 2b of the intake passage 2 downstream of the filter space 2a. The downstream passage wall portion 220 has a cylindrical wall 221 formed in a cylindrical shape to surround the entire area of the throttled space 2b, and a funnel port 221a and an outlet port 221b are opened in the cylindrical wall 221.

The funnel port 221a is provided at the upstream end of the cylindrical wall 221 that protrudes into the filter space 2a. The funnel port 221a has a tapered shape, and widens towards the end so as to gently compress the intake air in the filter space 2a into the throttled space 2b. The diameter of the funnel port 221a is gradually increased as moving toward the filter space 2a. In this embodiment, the funnel port 221a is separately formed and joined to the cylindrical wall 221. The outlet port 221b is provided at a downstream end of the cylindrical wall 221 which projects to outside of the downstream casing member 22. The outlet port 221b causes the intake air contracted in the throttled space 2b to flow toward the internal combustion engine.

The air physical quantity sensor 30 is installed downstream of the air filter 10 in order to detect a specific physical quantity related to the filtered intake air. As shown in FIGS. 2 to 7, the air physical quantity sensor 30 includes a sensor body 31, a sensor element 32, a sensor circuit 33, terminals 34a, 34b, and 34c and a conductive plate 35.

The sensor body 31 is formed in a block shape and is made of an insulating material. The insulating material forming the sensor body 31 is, for example, an insulating resin. In the present embodiment, the sensor body 31 is made of polyester resin such as polybutylene terephthalate resin. As shown in FIG. 2, the sensor body 31 is located at a middle part in the cylindrical wall 221 between the funnel port 221a and the outlet port 221b, and is fixed to the downstream passage wall portion 220 of the downstream casing member 22 of the filter casing 20. In this embodiment, the sensor body 31 is fixed to the cylindrical wall 221 at an upstream portion Su and a downstream portion Sd. The sensor body 31 is airtightly fitted and mounted in a mounting hole 221c passing through the cylindrical wall 221, whereby the sensor body 31 is arranged to straddle the inside and outside of the downstream casing member 22.

As shown in FIGS. 3 to 7, the sensor body 31 has a bypass passage 310 at a position exposed to the throttled space 2b of the intake passage 2 in the cylindrical wall 221. The bypass passage 310 includes a forward space 310a and a bypass space 310b. The forward space 310a extends like a cylindrical hole from the upstream side to the downstream side of the throttled space 2b. As a result, the forward space 310a allows the intake air, which is diverted from the throttled space 2b downstream of the air filter 10, to flow in a substantially same forward direction as the throttled space 2b. As shown in FIGS. 4 to 7, the bypass space 310b has U-shape in an area between the upstream end and the downstream end of the forward space 310a. As a result, the bypass space 310b is configured so that the intake air diverted from the throttled space 2b downstream of the air filter 10 flows upward and downward in the bypass direction substantially perpendicular to the forward direction in the throttled space 2b.

As shown in FIGS. 2 to 7, the sensor body 31 has an insulating bypass wall 311 entirely exposed to each of the spaces 310a, 310b of the bypass passage 310 in the cylindrical wall 221. The sensor body 31 has an insulating circuit protection wall 312 over the entire area of a protruding portion protruding from the bypass wall 311 to the outside of the cylindrical wall 221. The sensor body 31 of the present embodiment has a piece forming a part of the bypass wall 311, a piece forming a part of the circuit protection wall 312, and a piece forming the remaining part other than the bypass wall 311 and the circuit protection wall 312, which are formed separately and joined together.

Figure 7:
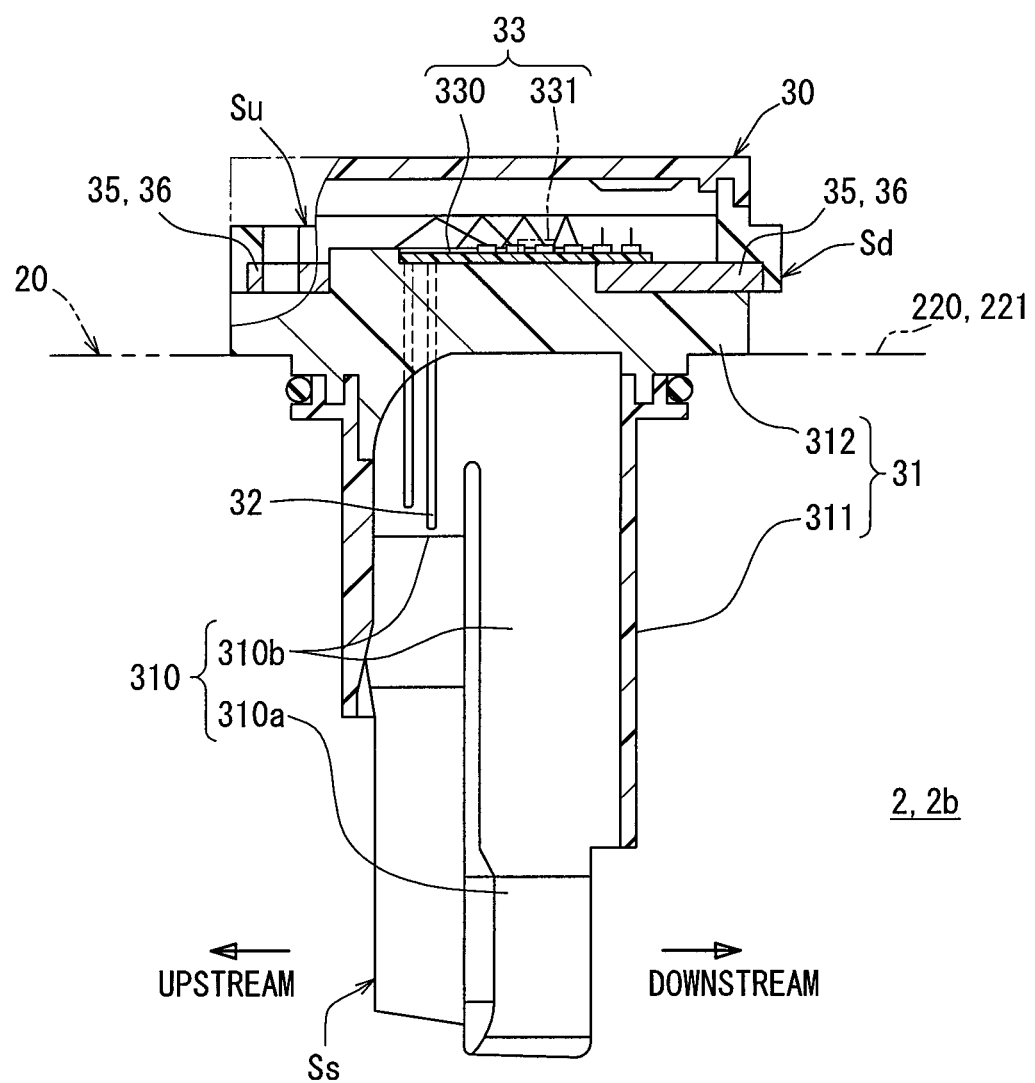
FIG. 7 is a sectional view illustrating the air physical quantity sensor of the intake device according to the embodiment.

As shown in FIG. 7, the sensor element 32 is fitted in the sensor body 31 by insert molding, between the bypass wall 311 and the circuit protection wall 312. The sensor element 32 projects into the bypass space 310b of the bypass passage 310. The sensor element 32 detects the specific physical quantity of the intake air diverted from the throttled space 2b of the intake passage 2 toward the sensor element 32 in the bypass passage 310 downstream of the air filter 10. The specific physical quantity detected by the sensor element 32 is, for example, a flow rate, a pressure, a humidity or a temperature of intake air. In this embodiment, the sensor element 32 detects a flow rate of intake air, and includes a flow rate detecting element such as hot wire element or Karman vortex element in the sensor body 31.

Figure 3:
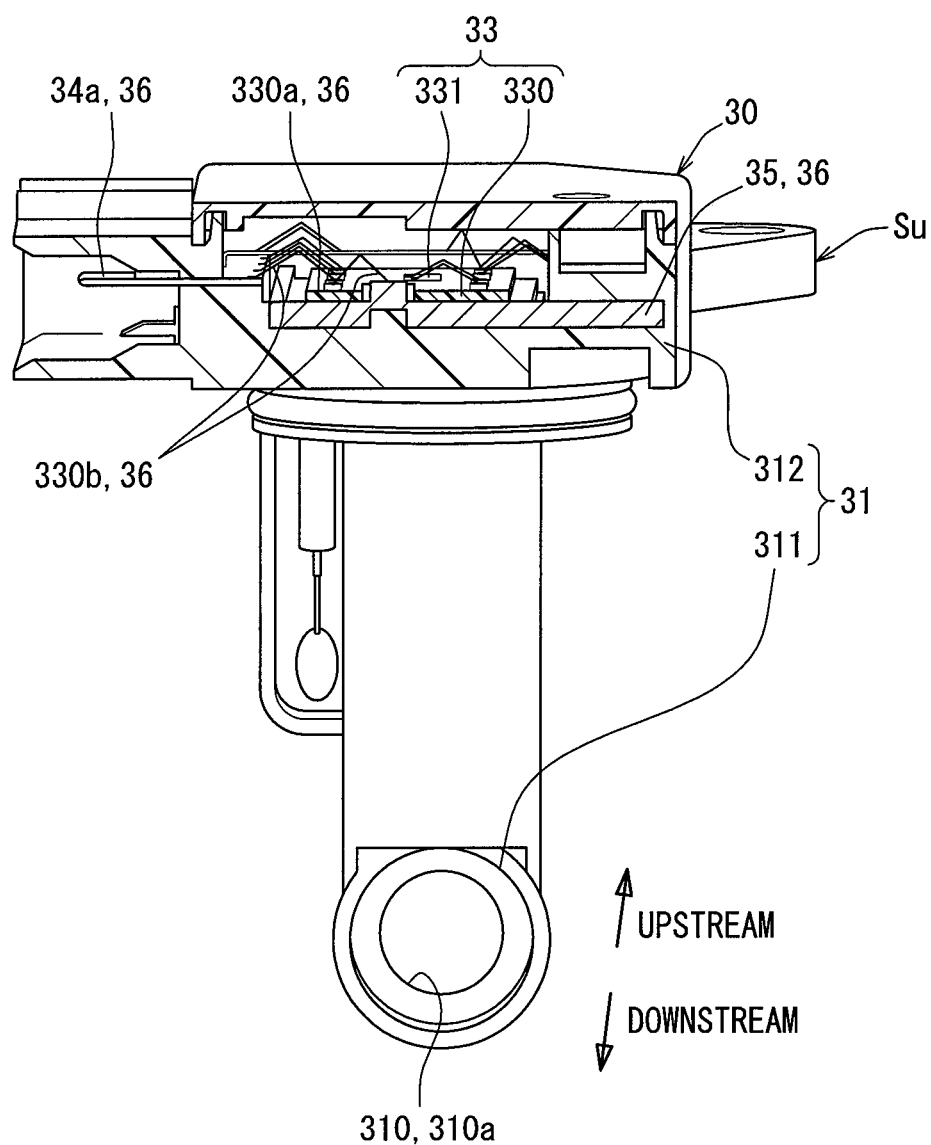
FIG. 3 is an enlarged view illustrating an air physical quantity sensor of the intake device according to the embodiment.
Figure 4:
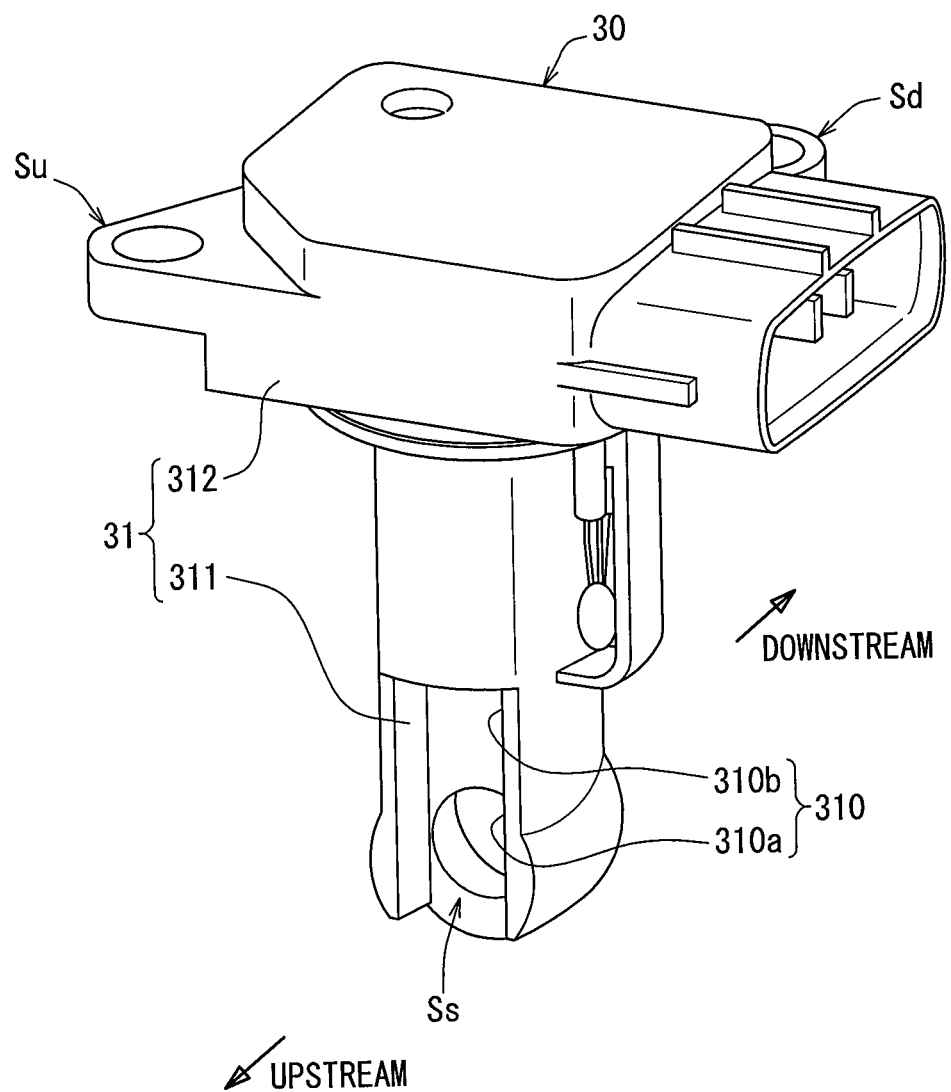
FIG. 4 is a perspective view illustrating the air physical quantity sensor of the intake device according to the embodiment.
Figure 5:
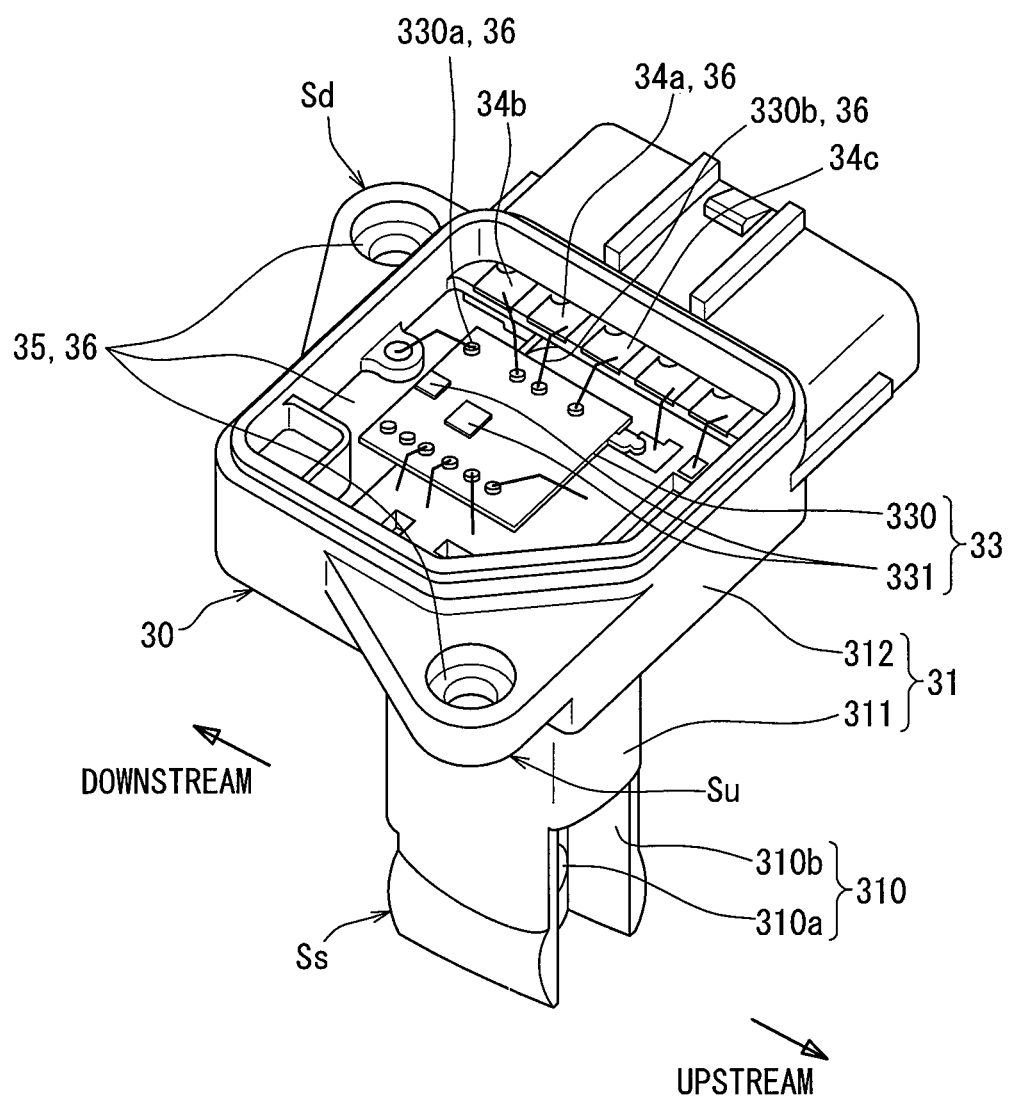
FIG. 5 is another perspective view illustrating the air physical quantity sensor of the intake device according to the embodiment.
Figure 6:
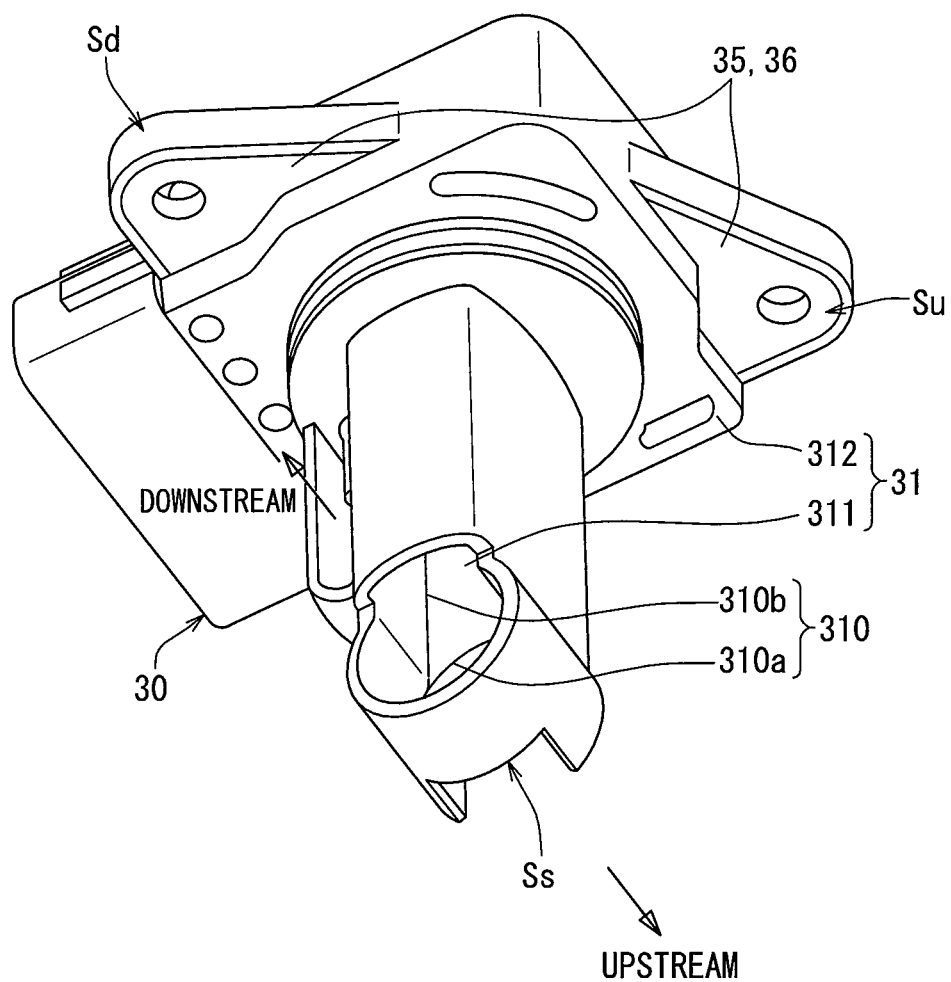
FIG. 6 is another perspective view illustrating the air physical quantity sensor of the intake device according to the embodiment.

As shown in FIGS. 3, 5, and 7, the sensor circuit 33 is disposed in the sensor body 31 by insert molding, and is covered by the circuit protection wall 312. The sensor circuit 33 is an electronic circuit formed by mounting plural circuit elements 331 on the circuit board 330, and is electrically connected to the sensor element 32. The sensor circuit 33 calculates a specific physical quantity based on the detection signal output from the sensor element 32.

As shown in FIGS. 2, 3, and 5, the terminal 34a, 34b, 34c is formed in a thin plate shape and is made of a conductive material. The conductive material for forming the terminal 34a, 34b, 34c is, for example, a metal having high conductivity, such as phosphor bronze or brass in this embodiment. Each of the terminals 34a, 34b, 34c is disposed in the sensor body 31 by insert molding, and is covered by the circuit protection wall 312. Each terminal 34a, 34b, 34c protrudes out of the sensor body 31. Each terminal 34a, 34b, 34c is electrically connected to the sensor circuit 33. Each terminal 34a, 34b, 34c is electrically connected to a control unit mounted on the vehicle through a harness (not shown).

The ground terminal 34a is used to ground the sensor circuit 33 and the sensor element 32 to form a zero potential. The power supply terminal 34b is used to apply a battery voltage referenced to the zero potential to the sensor circuit 33 and the sensor element 32. The sensor terminal 34c is used to output a signal representing the specific physical quantity calculated by the sensor circuit 33 to the control unit.

As shown in FIGS. 2, 3, 5 to 7, the conductive plate 35 is formed in a flat plate shape and is made of a conductive material. The conductive material forming the conductive plate 35 is, for example, a metal with high conductivity, such as aluminum in the present embodiment. The conductive plate 35 is disposed in the sensor body 31 by insert molding, and is covered by the circuit protection wall 312. The conductive plate 35 is exposed to the outside of the sensor body 31 at fixing portions of the sensor body 31 such as the upstream portion Su and the downstream portion Sd relative to the cylindrical wall 221 of the downstream passage wall portion 220.

The upstream portion Su is defined to be upstream of the branch point Ss, where the bypass passage 310 is branched from the throttled space 2b in the intake passage 2. The downstream portion Sd is defined to be downstream of the branch point Ss. The upstream portion Su of the conductive plate 35 exposed to the outside of the sensor body 31 is screwed to a conductive boss portion 221d of the cylindrical wall 221. As a result, the sensor body 31 is fixed to the cylindrical wall 221 through the conductive plate 35 electrically connected to the cylindrical wall 221 at the upstream portion Su upstream of the branch point Ss. On the other hand, the downstream portion Sd of the conductive plate 35 exposed to the outside of the sensor body 31 is screwed to a conductive boss portion 221e of the cylindrical wall 221. As a result, the sensor body 31 is fixed to the cylindrical wall 221 through the conductive plate 35 electrically connected to the cylindrical wall 221 at the downstream portion Sd downstream of the branch point Ss. As shown in FIG. 2, a screw member 350 for clamping the conductive plate 35 to the cylindrical wall 221 at the upstream portion Su and the downstream portion Sd through the branch point Ss may be made of an insulating resin. In the present embodiment, the screw member 350 is formed of a conductive material such as metal.

The conductive plate 35 is electrically connected to the ground terminal 34a via a ground pattern 330a and a wire bonding 330b on the circuit board 330 in the sensor circuit 33, as shown in FIGS. 3 and 5. Similarly, the sensor element 32 is electrically connected to the ground terminal 34a via the ground pattern 330a and the wire bonding 330b on the circuit board 330. As shown in FIGS. 2, 3, 5 to 7, the conductive plate 35, the ground pattern 330a, the wire bonding 330b, the terminal 34a in the sensor body 31 form a grounding structure 36 for grounding the sensor element 32 to zero potential, while being electrically connected to the downstream passage wall portion 220.

The effects and advantages of the intake device 1 will be described below.

Figure 8:
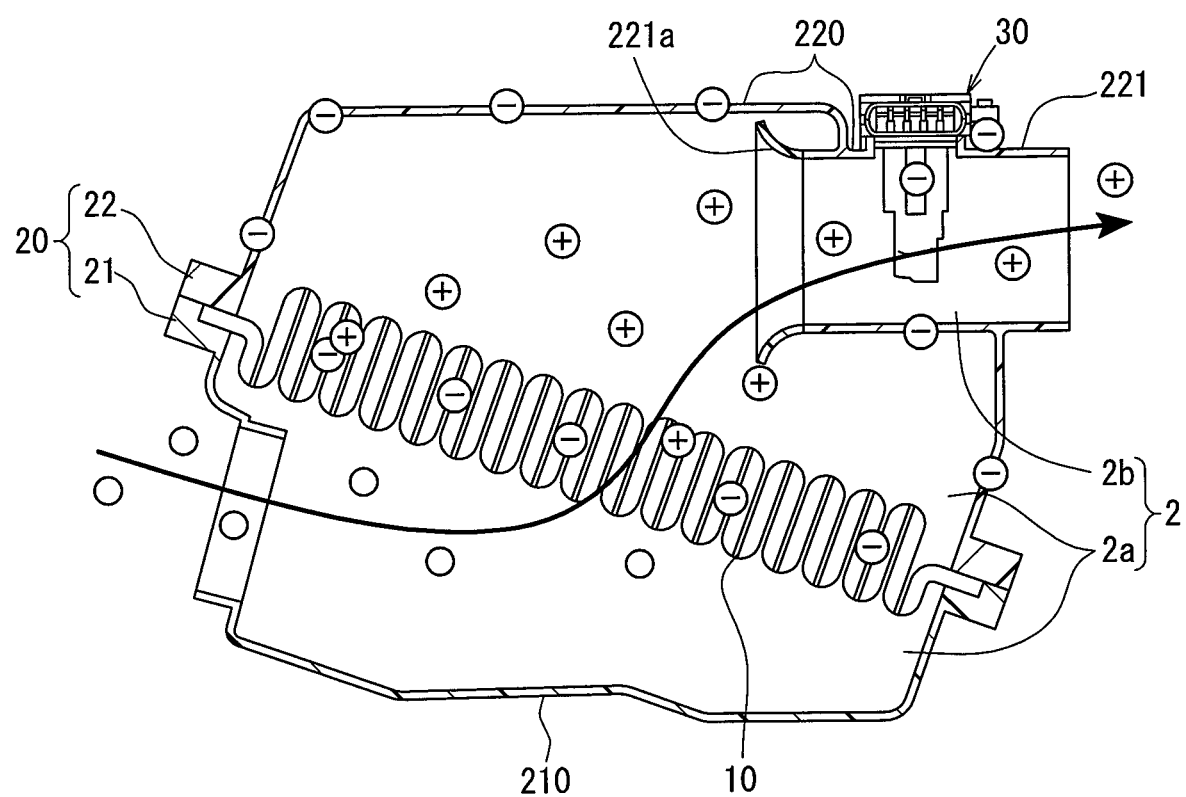
FIG. 8 is a schematic view for explaining effects of the intake device according to the embodiment.
Figure 9:
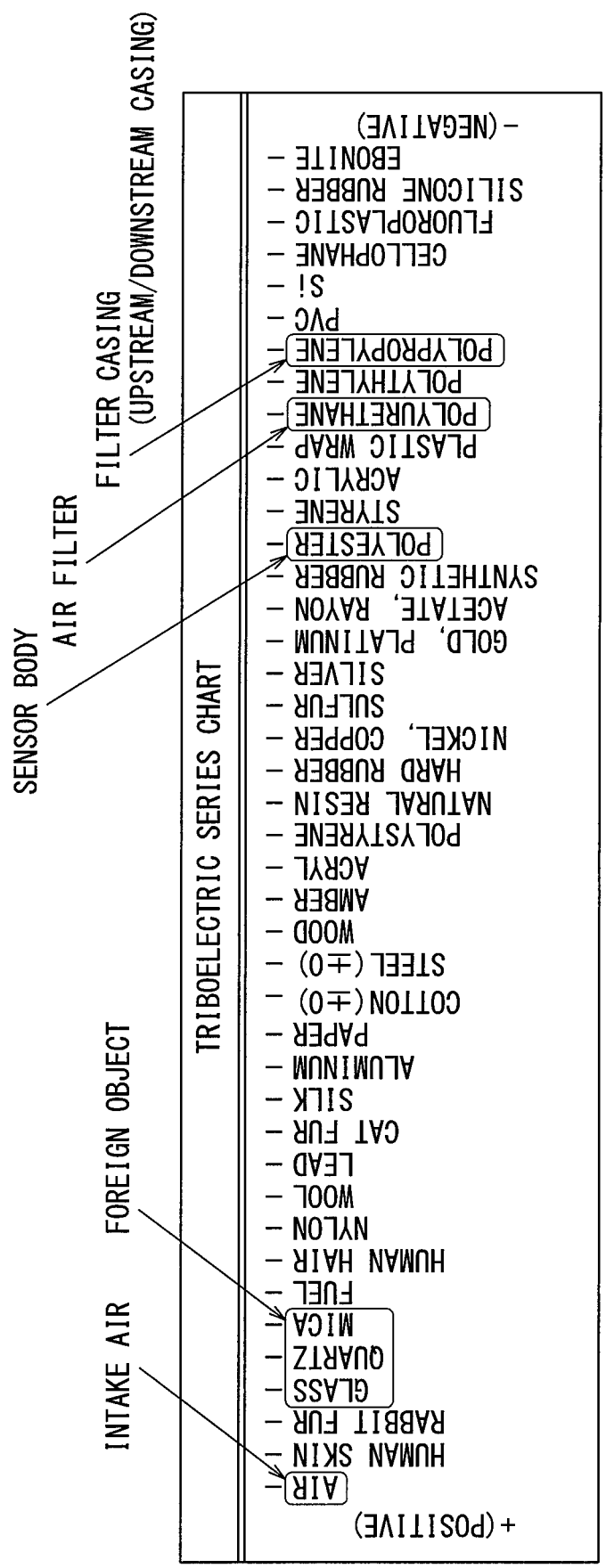
FIG. 9 is a triboelectric series chart for explaining effects of the intake device according to the embodiment.

According to the intake device 1, the downstream passage wall portion 220 of the filter casing 20 downstream of the air filter 10 is exposed to the intake passage 2 through which the intake air passes from the upstream to the downstream of the air filter 10 housed inside the filter casing 20. Therefore, as shown in FIG. 8, the downstream passage wall portion 220 is negatively charged (− in FIG. 8) by frictional contact with intake air or foreign objects contained in intake air (for example, fine particulate dust such as glass, quartz, mica or the like smaller than the mesh of the air filter 10). Therefore, the positively-charged foreign particles in the intake air (+ in FIG. 8) due to frictional contact with the air filter 10 may electrodeposit on the surface of the downstream passage wall portion 220. Further, according to the intake device 1, the specific physical quantity related to the intake air is detected by the sensor element 32 of the air physical quantity sensor 30 downstream of the air filter 10. As shown in FIG. 8, the air physical quantity sensor 30 is negatively charged (− in FIG. 8) due to frictional contact with intake air or foreign matter. Therefore, the positively-charged foreign matter in the intake air may electrodeposit on the surface of the air physical quantity sensor 30. The electric charge is uniquely determined as positive or negative according to the correlation between the frictional contact elements as shown in FIG. 9.

According to the intake device 1, the grounding structure 36 for grounding the sensor element 32 of the air physical quantity sensor 30 is electrically conductive with the conductive downstream passage wall portion 220. In this conductive connection state, the negative charge charged on each of the downstream passage wall portion 220 and the air physical quantity sensor 30 can be quickly released to the grounding structure 36. Accordingly, it is difficult for the foreign matter charged with the positive charge to electrodeposit on the surface of the downstream passage wall portion 220 and the surface of the air physical quantity sensor 30 downstream of the air filter 10. Therefore, the resistance of intake air (pressure loss of intake air) can be reduced, which is increased by the separation of the positively-charged intake air or foreign matter from the surfaces of the downstream passage wall portion 220 and the air physical quantity sensor 30. Therefore, it is possible to improve the intake efficiency. Further, contamination of the air physical quantity sensor 30 itself due to electrodeposition of foreign matter can be reduced, so that deterioration of the sensor 30 can be suppressed.

Further, according to the air physical quantity sensor 30 of the intake device 1, the sensor body 31 including the sensor element 32 and the grounding structure 36 is formed of an insulating material and fixed to the downstream passage wall portion 220. When negative charges generated by frictional contact with intake air or foreign matter are accumulated on the downstream passage wall portion 220, due to dielectric breakdown, the negative electric charge may escape to the sensor body 31 made of the insulating material. However, the negative charge generated by the frictional contact with the intake air or the foreign matter at the downstream passage wall portion 220 can be quickly released to the grounding structure 36 in the conductive connection state, so as to avoid the escape to the sensor body 31. This makes it difficult for the positively charged particles to electrodeposit not only on the surface of the downstream passage wall portion 220 but also on the surface of the sensor body 31. Therefore, it is possible to suppress the resistance of intake air from increasing, which is caused by the separation of intake air from the surfaces of the downstream passage wall portion 220 and the sensor body 31. Thus, it is possible to improve the intake efficiency. Further, contamination of the air physical quantity sensor 30 itself due to electrodeposition of foreign matter can be reduced, so that deterioration of the sensor 30 can be suppressed.

Furthermore, according to the air physical quantity sensor 30 of the intake device 1, the negative electric charge is released from a portion of the downstream passage wall portion 220 electrically connected with the grounding structure 36, at a location downstream of the air filter 10. As shown in FIG. 7, the negative electric charge is released at the upstream portion Su upstream of the branch point Ss where the bypass passage 310 of the sensor body 31 is branched from the intake passage 2 toward the sensor element 32, downstream of the air filter 10. Accordingly, the negative charge of the downstream passage wall portion 220 can be restricted from escaping, due to dielectric breakdown, to the bypass wall 311 exposed to the bypass passage 310 in the sensor body 31 made of the insulating material, at a location downstream of the conductive connecting portion between the downstream passage wall portion 220 and the grounding structure 36. Therefore, it is difficult for the positively-charged foreign matter to electrodeposit on the surface of the bypass wall 311, so that the detection accuracy of the sensor element 32 can be restricted from decreasing, which may be caused by the separation of intake air from the surface of the bypass wall 311. Thus, it is possible to improve the detection performance by the air physical quantity sensor 30 as well as to improve the intake efficiency by suppressing increase in the resistance of intake air. Further, contamination of the air physical quantity sensor 30 itself due to electrodeposition of foreign matter can be reduced, so that deterioration of the sensor 30 can be suppressed.

In addition, according to the filter casing 20 of the intake device 1, the intake passage 2 is throttled at the location where the downstream passage wall portion 220 is exposed, downstream of the air filter 10, to contract the flow of intake air. The intake air or foreign matter in the intake air may gather to the throttled point of the intake passage 2 due to the contracted flow, and may make frictional contact with the downstream passage wall portion 220. However, even if negative electric charges are generated by frictional contact with intake air or foreign matter, the electric charges can be quickly released by the downstream passage wall portion 220 electrically connected with the grounding structure 36, to reduce the electrodeposit of the foreign matter positively charged. Therefore, it is possible to suppress increase in the resistance of intake air, which is caused by the separation of the contracted intake air. Accordingly, the intake efficiency can be improved.

In addition, according to the downstream passage wall portion 220 of the intake device 1, the cylindrical wall 221 surrounds the throttled space 2b throttled downstream of the filter space 2a housing the air filter 10 in the intake passage 2. The cylindrical wall 221 has the funnel port 221a with the diameter gradually enlarged toward the filter space 2a of the intake passage 2. Accordingly, the intake passage 2 is gradually throttled in the throttled space 2b, to gently produce the contraction flow of intake air. The separation of intake air from the surface of the cylindrical wall 221 can be reduced, which is caused not only by the electrodeposition of the charged foreign matter but also the contraction itself. Therefore, it is possible to effectively suppress increase in the resistance of intake air caused by the contracted intake air, to improve the intake efficiency.

In addition, according to the filter casing 20 of the intake device 1, the conductive downstream passage wall portion 220 and the upstream passage wall 210 exposed to the intake passage 2 upstream of the air filter 10 are electrically connected to each other. Since the downstream passage wall portion 220 is in the conductive connection state with the grounding structure 36, negative charges can be quickly released from both of the downstream passage wall portion 220 and the upstream passage wall 210. Accordingly, it is difficult for the positively-charged particles to electrodeposit on the filter casing 20 (both the casing members 21, 22 in this embodiment) on the downstream side and the upstream side of the air filter 10. Therefore, it is possible to effectively suppress increase in the resistance of intake air caused by the separation of intake air, to improve the intake efficiency.

Other Embodiments

The present disclosure should not be limited to the embodiment and may be applied to various other embodiments and various combinations of the embodiments within the scope of the present disclosure.

Figure 10:
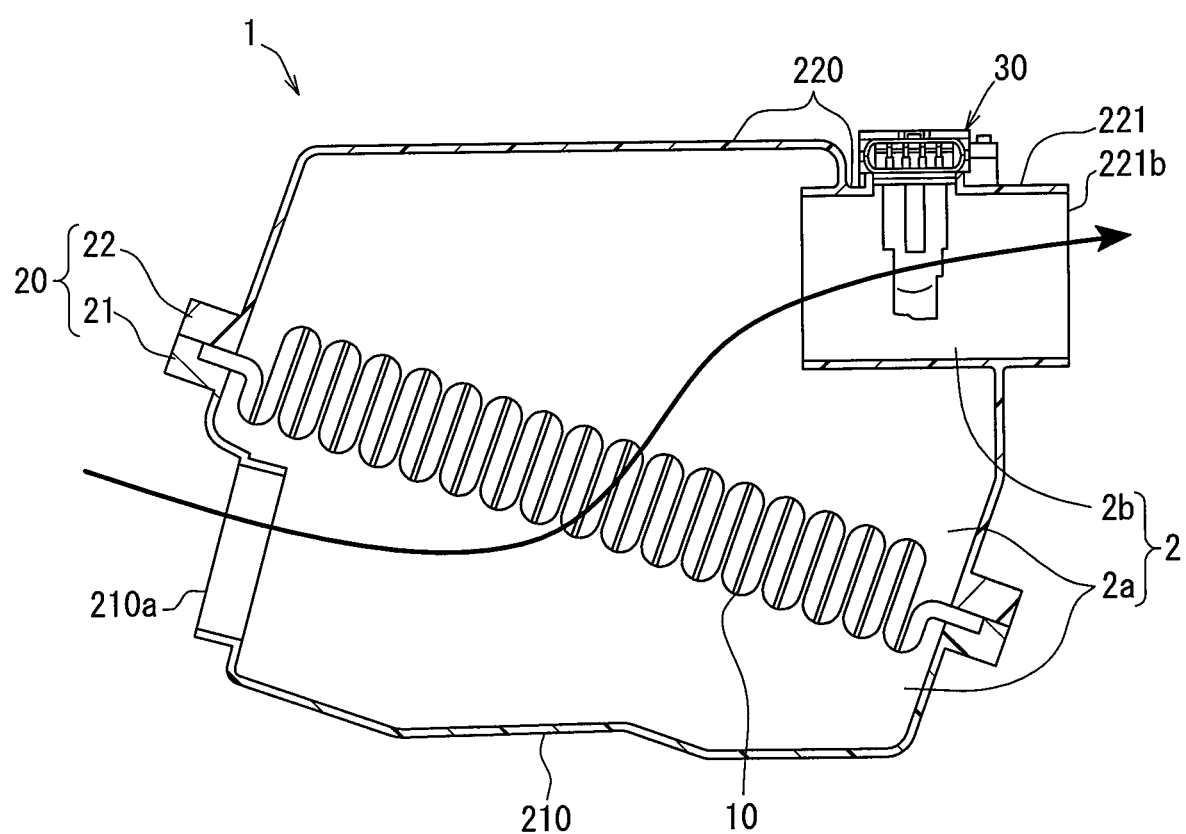
FIG. 10 is a sectional view illustrating a modification in FIG. 1.

Specifically, as shown in FIG. 10, in Modification 1, the funnel port 221a is not provided at the upstream end of the cylindrical wall 221 that protrudes into the filter space 2a. For example, the upstream end is straight cylindrical opening.

In Modification 2, the conductivity may be imparted to only a part of the downstream passage wall portion 220 electrically conductive with the grounding structure 36, which includes an inner surface portion. In Modification 2, the insulating base material of the downstream passage wall portion 220 is plated or painted with a conductive material. Alternatively, a conductive base material is inserted into the insulating base material of the downstream passage wall portion 220. Alternatively, in Modification 2, at least two of the followings are combined, a portion formed of conductive resin or metal as the conductive material, a portion plated or coated with the conductive material, and a portion where the conductive material is inserted.

In Modification 3, the conductivity may be given only to a part of the upstream passage wall 210. In Modification 3, the insulating base material of the upstream passage wall 210 is plated or painted with a conductive material, or the conductive base material is inserted into the insulating base material of the upstream passage wall 210. Alternatively, in Modification 3, at least two of the followings are combined, a portion formed of conductive resin or metal as the conductive material, a portion plated or coated with the conductive material, and a portion where the conductive material is inserted.

In Modification 4, the conductivity may be provided not over the entire area of the upstream passage wall 210. In Modification 4, the downstream passage wall portion 220 may be made of single or plural insulating materials.

Figure 11:
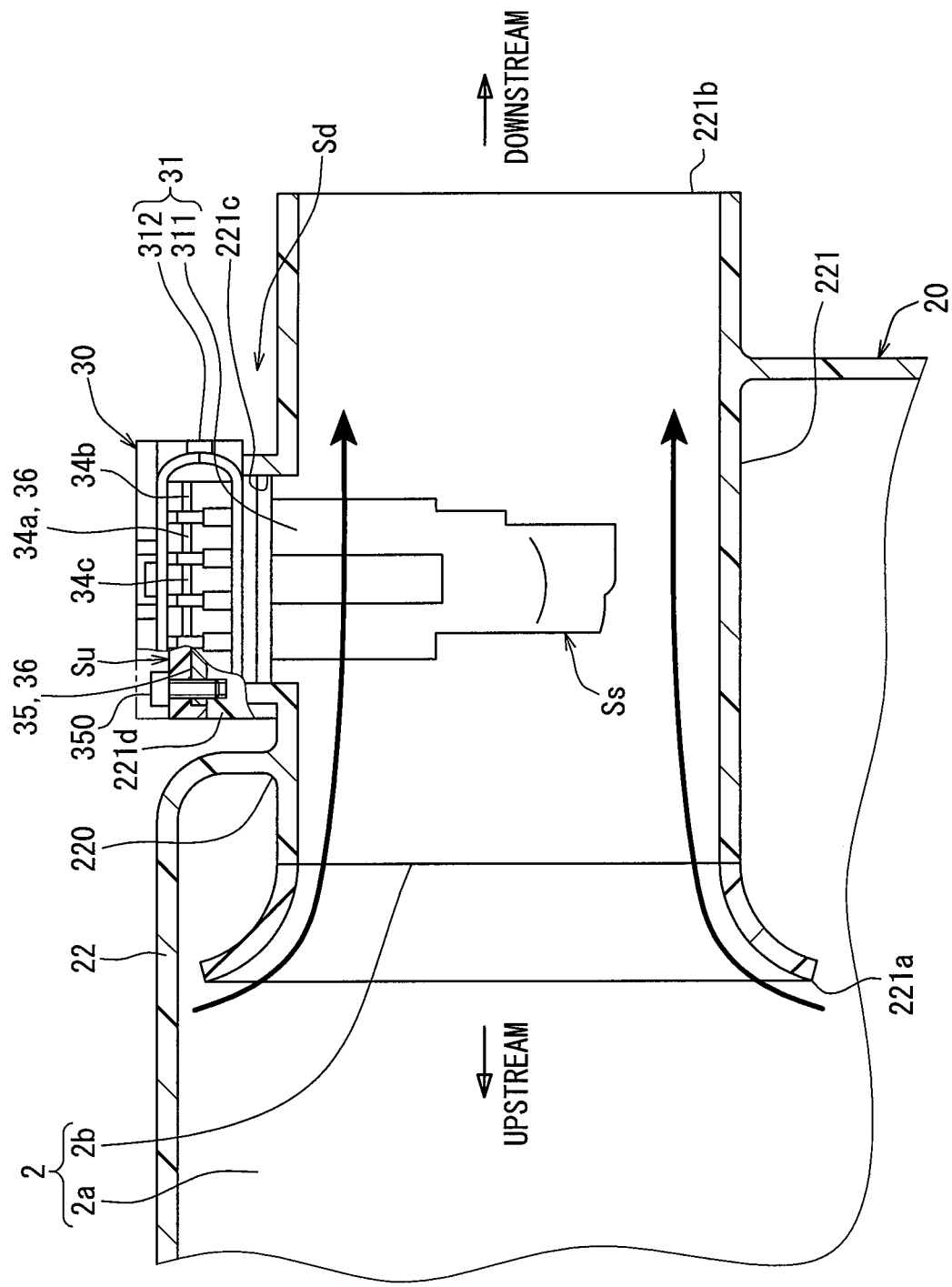
FIG. 11 is a sectional view illustrating a modification in FIG. 2.
Figure 12:
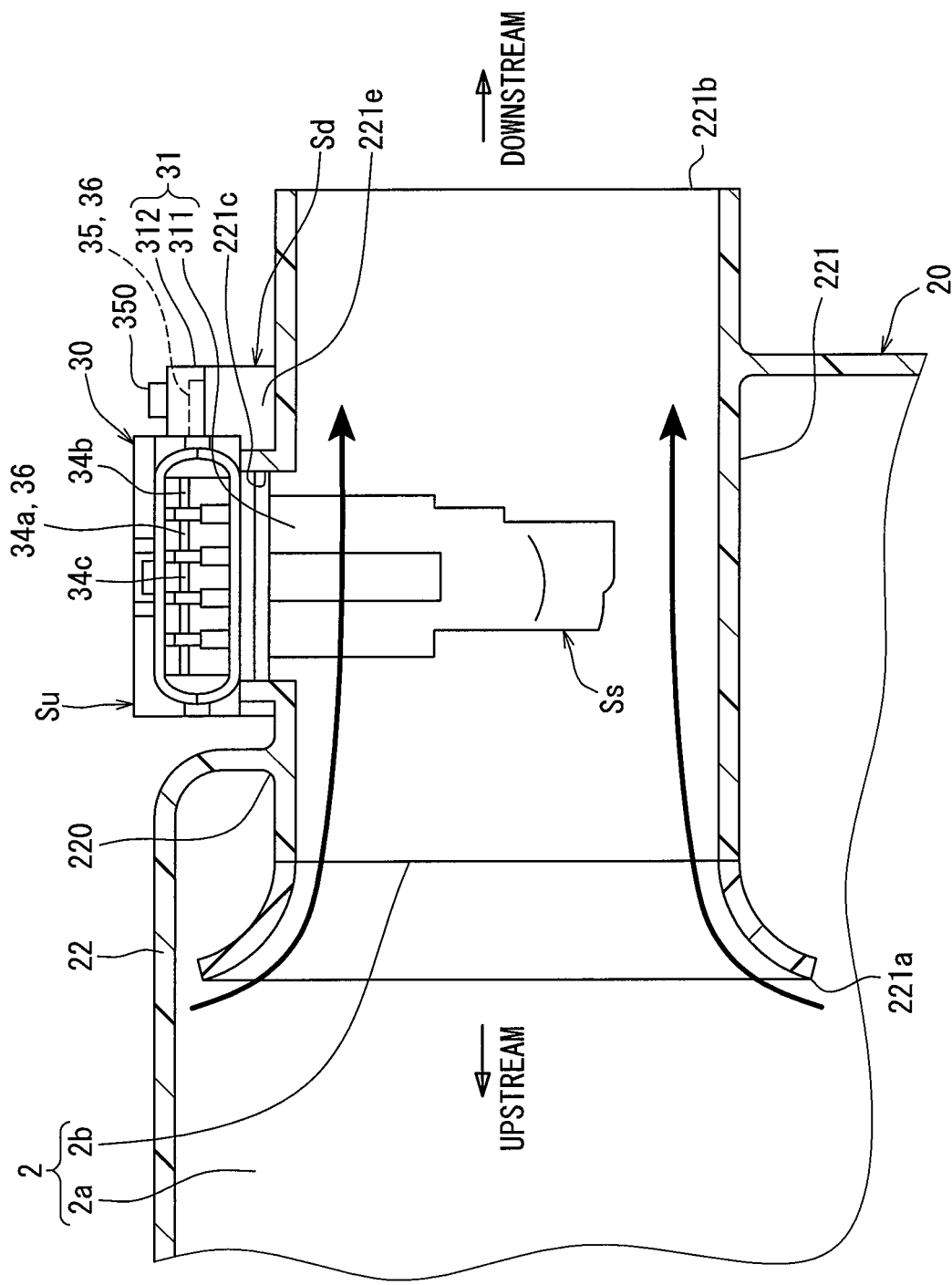
FIG. 12 is a sectional view illustrating a modification in FIG. 2.

As shown in FIG. 11, in Modification 5, the conductive plate 35 of the grounding structure 36 is electrically connected to the downstream passage wall portion 220 only at the upstream portion Su upstream of the branch point Ss where the bypass passage 310 is branched from the intake passage 2. As shown in FIG. 12, in Modification 6, the conductive plate 35 of the grounding structure 36 is electrically connected to the downstream passage wall portion 220 only at the downstream portion Sd downstream of the branch point Ss where the bypass passage 310 is branched from the intake passage 2. In Modification 7, the conductivity may be given to a part or entire area of the sensor body 31 while being insulated from the sensor circuit 33.

What is claimed is:

1. An intake device comprising:
    an air filter that filters intake air for an internal combustion engine;
    a filter casing housing the air filter and including an intake passage to allow the intake air to pass from upstream to downstream of the air filter, the filter casing having a passage wall portion located downstream of the air filter, the passage wall portion being electrically conductive and exposed to the intake passage; and
    an air physical quantity sensor having
        a sensor element located downstream of the air filter to detect a specific physical quantity related to the intake air, and
        a grounding structure electrically connected to the passage wall portion for grounding the sensor element; wherein:
    the sensor element is connected to the grounding structure through a circuit board, and the grounding structure grounds the passage wall portion and the sensor element at a same electric potential; and
    the grounding structure includes a conductive plate in a direct contact with the passage wall portion and the circuit board.

2. The intake device according to claim 1, wherein
    the air physical quantity sensor has a sensor body housing the sensor element and the grounding structure,
    the sensor body is made of an insulating material, and
    the sensor body is fixed to the passage wall portion.

3. The intake device according to claim 2, wherein
    the sensor body includes a bypass passage located downstream of the air filter,
    the bypass passage diverges the intake air at a branch point from the intake passage toward the sensor element,
    the sensor body has a bypass wall exposed to the bypass passage, and
    the grounding structure is electrically connected to the passage wall portion at a location upstream of the branch point.

4. The intake device according to claim 1, wherein
    the passage wall portion is exposed to a portion of the intake passage throttled at a location downstream of the air filter.

5. The intake device according to claim 4, wherein
    the intake passage includes a filter space housing the air filter, and a throttled space throttled at a location downstream of the filter space,
    the passage wall portion has a cylindrical wall that surrounds the throttled space, and
    the cylindrical wall has a funnel port with a diameter gradually enlarged toward the filter space.

6. The intake device according to claim 1, wherein
    the filter casing includes
        a downstream wall as the passage wall portion downstream of the air filter, and
        an upstream wall that is electrically conductive and exposed to the intake passage at a location upstream of the air filter, and
    the downstream wall and the upstream wall are electrically connected to each other.

7. The intake device according to claim 1, wherein at least a portion of the conductive plate is arranged between the passage wall portion and the circuit board.

8. The intake device according to claim 1, wherein:
    the conductive plate is electrically connected to a ground terminal via a ground pattern and a wire bonding on the circuit board; and
    the ground terminal, ground pattern and the wire bonding are components of the ground structure.

9. The intake device according to claim 1, wherein:
    the sensor element is electrically connected to a ground terminal via a ground pattern and a wire bonding on the circuit board; and
    the ground terminal, ground pattern and the wire bonding are components of the ground structure.

* * * * *